(12) United States Patent
Feldmann et al.

(10) Patent No.: US 12,196,598 B2
(45) Date of Patent: Jan. 14, 2025

(54) WEIGHING SCALE HAVING A MEASURING PLATFORM SUPPORTED BY SUPPORTING FEET

(71) Applicant: seca gmbh & co. kg, Hamburg (DE)

(72) Inventors: Patrick Feldmann, Hamburg (DE); Thomas Pritzlaff, Adendorf (DE); Kai Willenbrock, Hamburg (DE)

(73) Assignee: seca gmbh & co. kg, Hamburg (DE)

( * ) Notice: Subject to any disclaimer, the term of this patent is extended or adjusted under 35 U.S.C. 154(b) by 382 days.

(21) Appl. No.: 17/723,720

(22) Filed: Apr. 19, 2022

(65) Prior Publication Data

US 2022/0333973 A1 Oct. 20, 2022

(30) Foreign Application Priority Data

Apr. 19, 2021 (EP) .................................... 21169148

(51) Int. Cl.
| | |
|---|---|
| *G01G 21/23* | (2006.01) |
| *G01G 21/22* | (2006.01) |
| *G01G 21/28* | (2006.01) |
| *G01G 23/06* | (2006.01) |

(52) U.S. Cl.
CPC ............. *G01G 21/23* (2013.01); *G01G 21/28* (2013.01); *G01G 23/06* (2013.01); *G01G 21/22* (2013.01)

(58) Field of Classification Search
CPC ......... G01G 21/23; G01G 21/28; G01G 21/22
USPC ............................................................ 177/1
See application file for complete search history.

(56) References Cited

U.S. PATENT DOCUMENTS

| | | | | |
|---|---|---|---|---|
| 5,955,705 A | * | 9/1999 | Germanton | G01G 21/22 177/253 |
| 6,639,158 B2 | * | 10/2003 | Germanton | G01G 23/002 177/256 |
| 6,838,624 B2 | * | 1/2005 | Chan | G01G 21/23 73/1.13 |
| 6,936,776 B2 | * | 8/2005 | Germanton | G01G 19/44 248/646 |

(Continued)

FOREIGN PATENT DOCUMENTS

| | | | | |
|---|---|---|---|---|
| DE | 102008062249 | | 6/2010 | |
| DE | 102010016968 A1 | * | 11/2011 | ............. G01G 21/23 |
| DE | 102020124835 A1 | * | 10/2012 | ........... G01G 19/021 |

OTHER PUBLICATIONS

European Search Report for European Patent Application No. 21169148.0 (Sep. 17, 2021).

*Primary Examiner* — Jacques M Saint Surin
(74) *Attorney, Agent, or Firm* — Hovey Williams LLP

(57) ABSTRACT

A weighing scale has a measuring platform which is supported by at least three supporting feet resting on a floor, wherein to each supporting foot a load cell is assigned, wherein each load cell senses the share of the weight force originating from the measuring platform supported by the respective supporting foot. Each supporting foot is designed as a vertically extending measuring foot and comprises a load cell carrier on which the load cell rests and is attached, and an adjusting foot located below the load cell carrier. The load cell carrier is screwed with its external thread into the internal thread of the adjusting foot such that, by turning the adjusting foot relative to the load cell carrier, a vertical height of the measuring foot along a vertical screw axis is adjustable.

20 Claims, 3 Drawing Sheets

(56) References Cited

U.S. PATENT DOCUMENTS

Figure 1:
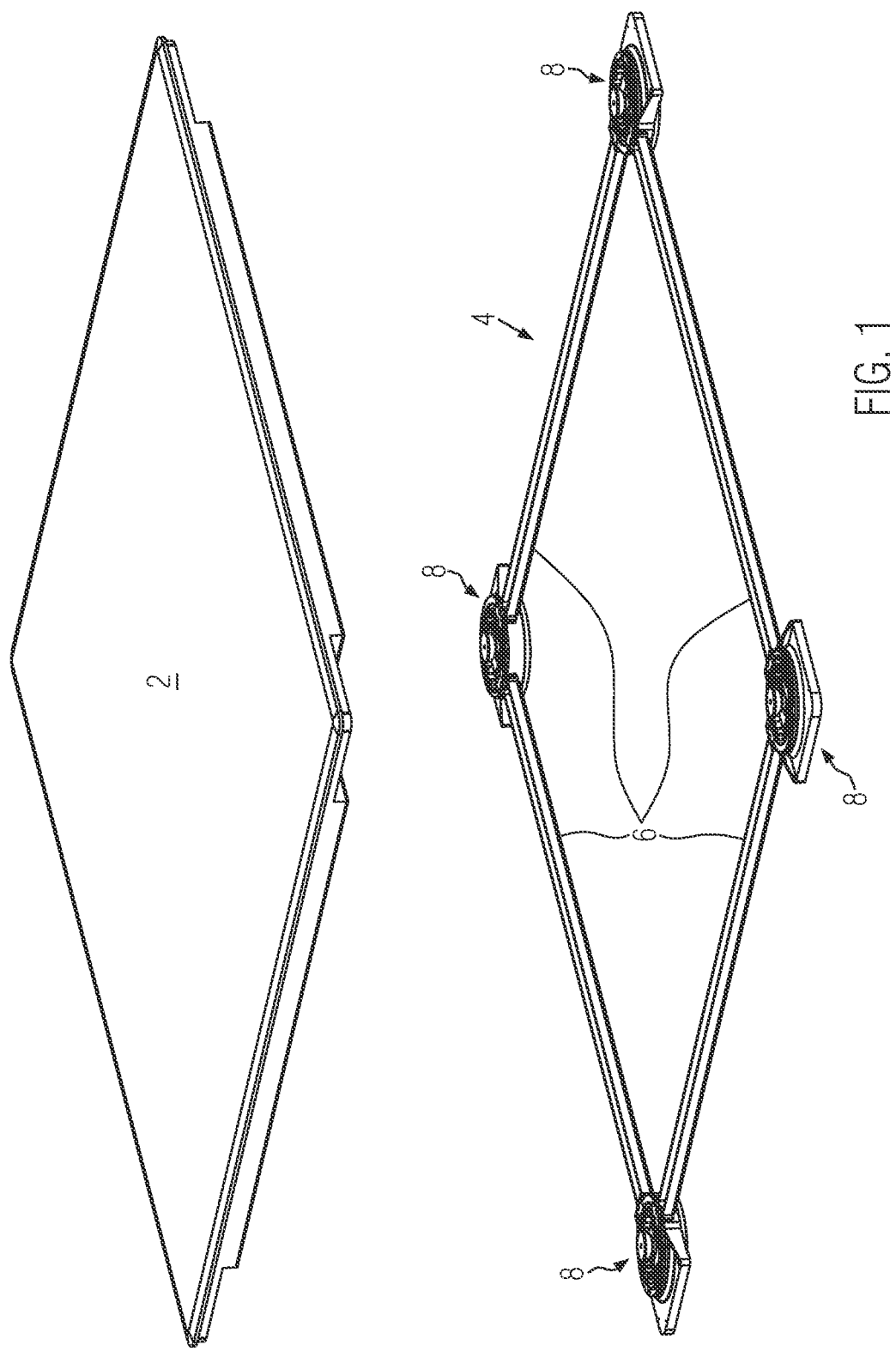

| | | | |
|---|---|---|---|
| 7,151,232 B2 * | 12/2006 | Germanton | G01G 21/23 248/646 |
| 7,910,841 B2 * | 3/2011 | Germanton | G01G 21/23 248/188 |
| 9,752,921 B2 * | 9/2017 | Kontschak | G01G 21/23 |
| 2004/0035610 A1 | 2/2004 | Chan | |
| 2011/0220425 A1 * | 9/2011 | Denk | G01G 23/3735 177/210 R |

* cited by examiner

WEIGHING SCALE HAVING A MEASURING PLATFORM SUPPORTED BY SUPPORTING FEET

CROSS-REFERENCE TO RELATED APPLICATION

The present application claims priority from European Patent Application No. 21169148.0, filed Apr. 19, 2021, and entitled WEIGHING SCALE HAVING A MEASURING PLATFORM SUPPORTED BY SUPPORTING FEET, the entire disclosure of each of which is hereby incorporated by reference herein.

BACKGROUND OF THE INVENTION

1. Field of the Invention

The present invention relates to a weighing scale having a measuring platform which is supported by at least three supporting feet resting on a floor, wherein a load cell is assigned to each supporting foot, which load cell senses a share of the weight force originating from the measuring platform, which share is exerted by the measuring platform on the respective measuring foot.

Such weighing scales are used as bathroom scales or personal scales and for scales for weighing objects.

When reference is made to a vertical direction in the present disclosure, this vertical direction relates to the direction of the gravitational force of the earth and to a positioning of the scale in which the scale is ready for use resting on a planar, horizontal floor supporting the scale.

2. Discussion of the Prior Art

A typical conventional weighing scale has below its measuring platform a stable, rectangular support frame. In the corner areas of the support frame horizontally outwardly extending beams are mounted which carry, on the upper surface facing the lower surface the measuring platform, on each beam a load cell. Each horizontal beam is provided with a support foot which extends from its lower side facing away from the measuring platform vertically downwards and which is in horizontal direction shifted outwards relative to the load cell. Each supporting foot is screwed into a thread of the associated horizontal beam such that the height of the supporting foot on the horizontal beam is adjustable by turning the support foot.

The described construction has several disadvantages. The supporting feet and their height adjustable mounting to the beams are located vertically on a lower level below the load cells so that the overall heights of the afore-mentioned components add up to a total overall height. Furthermore, the horizontal displacement of the supporting foot relative to the load cell causes substantial leverage and drag forces that are exerted on the horizontal beams, which leverage is created by the distance between the horizontal position of the application or force to the load cell to the horizontal position of the supporting foot which transmits the force further to the floor. Such leverage may cause bending of the horizontal beams and may negatively affect the measuring precision of the scale.

SUMMARY

It is an object of the present invention to design a weighing scale so that a very low overall height of the weighing scale can be achieved. It is a further object of the invention to configure a weighing scale in such a manner that also in case of high weight forces on the weighing scale no detrimental bending or flexing takes place so that it is possible also for large scales for high weight objects to realize a calibratable weighing device.

This object is achieved by the weighing scale comprising the features set forth herein.

In the weighing scale according to the present invention each supporting foot is designed as a measuring foot by integrating the assigned load cell into the measuring foot. For this purpose each supporting foot is configured as a vertically extending measuring foot which comprises: (i) a load cell carrier which is mounted to be non-rotatable with respect to the measuring platform and on which the load cell rests and is fixed, and which is provided with an external thread, and (ii) an adjusting foot located below the load cell carrier. The adjusting foot is configured to receive at least a vertical part section of the load cell carrier in an open, circular-cylindrical recess which is provided on its circumferential sidewall with an internal thread fitting to the external thread of the load cell carrier. The load cell carrier is screwed with its external thread into the internal thread of the adjusting foot so that by turning the adjusting foot relative to the load cell carrier the vertical height of the measuring foot along the screw axis is adjustable.

In this manner a low overall height of the weighing scale can be realized since the height adjusting mechanism can in vertical direction at least partially overlap with the load cell carrier and the load cell, whereas in the prior art the height adjustable support foot and the load cell carrier necessarily were arranged vertically shifted to each other, as has been described above.

Furthermore, a centered, vertical transmission of force from the load cell, via the load cell carrier to the adjusting foot takes place. As a result there is no bending in force transmitting components because there are no non-vertically extending force transmitting components. By avoiding leverage and bending resulting therefrom when force is transmitted, the accuracy of the measurement results of the weighing scale is improved, and it is possible even for large weighing scales constructed in this manner, which are designed for high load capacities, to realize a calibratable device.

In a preferred embodiment a damping support member is associated with each measuring foot, which damping support member is extending vertically between the measuring platform and the load cell located at the top of the measuring foot, and which is resting centered on the sensitive area of the load cell such that the force flow from the measuring platform is directed vertically through the damping support member into the load cell at the top of the measuring foot. The damping support member can be made of rubber as a rubber damping member. The damping support member can have any shape, for example the shape of a circular cylinder, of a prism, a disk, a cube and so on.

Preferably, in each measuring foot the load cell is supported in the load cell carrier in a centered manner, and the load cell carrier is screwed into the adjusting foot in a centered manner such that the force flow from the measuring platform is directed vertically through each measuring foot.

In a preferred embodiment each damping support member has a frusto-conical shape, wherein the larger end face of the frusto-conical damping support member is in contact with an underside of the measuring platform, and the frusto-conical damping support member rests with its smaller end face on the load cell.

In a preferred embodiment each measuring foot is at its lower end provided with a foot plate which is fixedly connected to a lower end of the adjusting foot facing away from the measuring platform, and which is configured to introduce the gravitational force transmitted through the measuring foot into the floor. The foot plate can be releasably or permanently connected to the adjusting foot.

In a preferred embodiment an adapter housing can be provided on one or each of the measuring feet, which adapter housing can be configured to accommodate or hold accessory parts which are not weighing relevant; not weighing relevant accessory parts are components which are not intended to contribute to the weighing process. Such not weighing relevant accessory parts have to be accommodated in a area of the weighing scale which is not weighing sensitive, as for example in the adapter housing such that they do not influence the weighing process. The adapter housing comprises a vertical passage. The adjusting foot extends through this passage, but is not connected to the adapter housing and can therefore be freely rotated in the passage. The foot plate extends beyond the opening of the passage of the adapter housing such that it prevents the adapter housing from becoming detached from the adjusting foot.

In a preferred embodiment there are four measuring feet which support the measuring platform. The four measuring feet may be located at the corner points of a square forming the measuring platform.

In a preferred embodiment the measuring feet are connected to each other to form a measuring feet assembly; for this purpose two frame members extend from each measuring foot, which frame members connect the measuring foot with the two nearest neighboring measuring feet. The frame members are connected to the measuring feet and therefore belong to the not weighing sensitive portion, i.e. their weight does not act on the load cells. In case of such measuring feet assembly electric conductors connected to the load cells can be routed in or on the frame members. It should be noted that this frame assembly has no load or weight carrying function.

Preferably, a plug socket is attached to at least one frame member, which plug socket is connected to a conductor extending in the frame member and which serves to connect an external plug to a conductor. Several plug sockets can be integrated in a port unit. Among the plug sockets can be USB sockets, network sockets or sockets for connecting a voltage supply. It is advantageous that in these embodiments cables connected to a plug socket are connected to a not weighing sensitive area and that, as a result, their weights has not influence on the weighing result.

BRIEF DESCRIPTION OF THE DRAWING FIGURES

Figure 2:
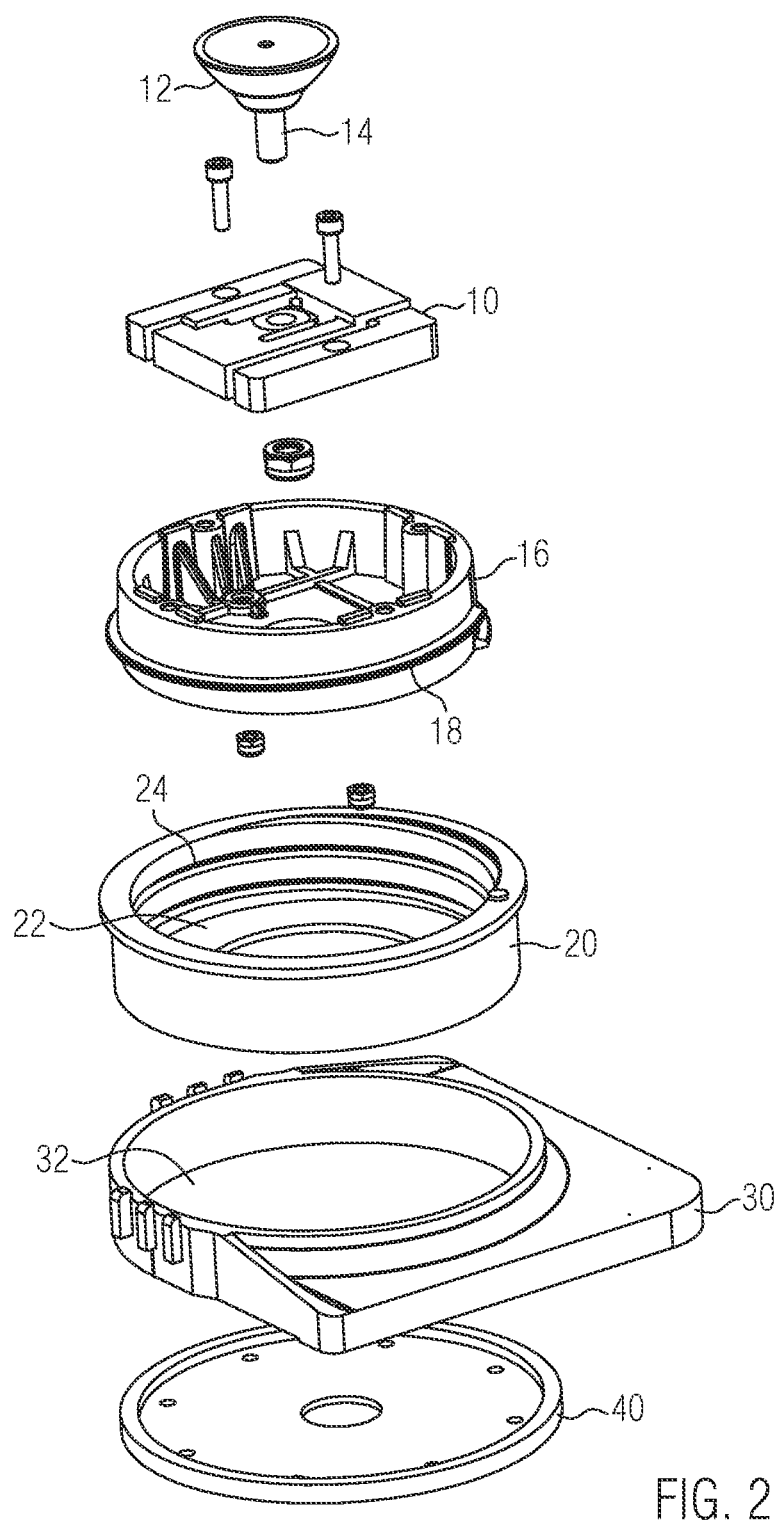
Figure 3:
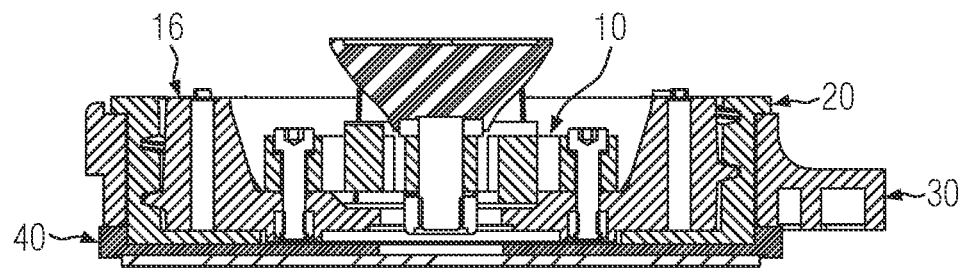
Figure 4:
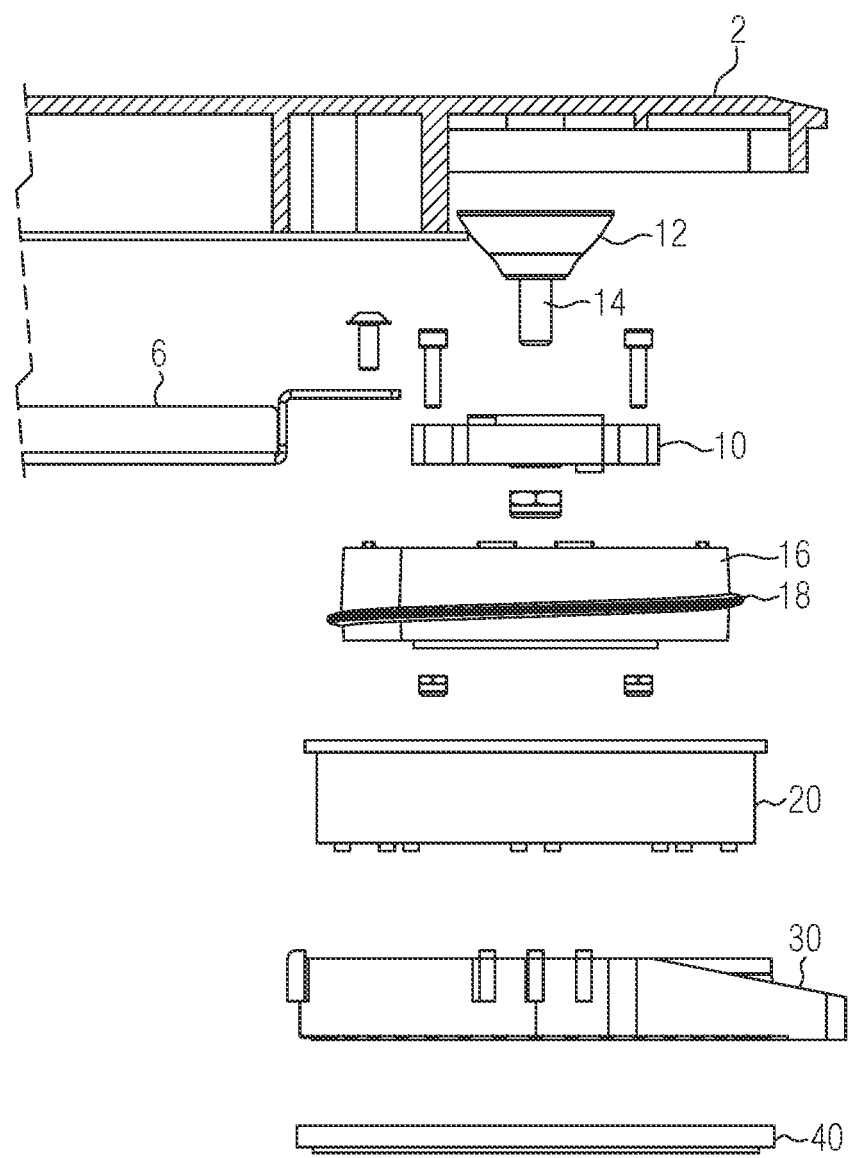

The invention will now be described with reference to an embodiment shown in the drawings in which:

FIG. 1 is a perspective view of an embodiment of the weighing scale, wherein the measuring platform is shown lifted off the measuring feet, FIG. 2 is a perspective explosive view of a measuring foot of the weighing scale of FIG. 1, FIG. 3 is a cross-sectional view of the measuring foot of the weighing scale of FIGS. 1 and 2, and FIG. 4 is a plane explosive side view of the measuring foot with the measuring platform in cross-section.

DETAILED DESCRIPTION

FIG. 1 shows an embodiment of the weighing scale in a perspective view, wherein a measuring platform 2 of the weighing scale is shown detached and uplifted from the measuring feet assembly 4. The measuring feet assembly 4 comprises four measuring feet 8 which are located at the corners of a square and which are connected to each other by frame members 6.

The construction of a single measuring foot 8 is in the following described with reference to FIGS. 2 to 4 which show the measuring foot in FIGS. 2 and 4 in explosive view and in FIG. 3 in a cross-sectional view. The measuring foot comprises a load cell 10, the upper side of which being exposed in an upper portion of the measuring foot. The load cell 10 is received in a load cell carrier 16 and attached to it. The load cell carrier 16 is generally cup-shaped with an open-topped receiving recess which is configured to receive the load cell 10 in a centered manner, and which has a circular-cylindrical circumferential wall. The load cell 10 is attached to the load cell carrier 16 for example by screws. The upper side of the load cell remains freely accessible in the open-topped load cell carrier 16.

The cylindrical outer wall of the cup-shaped load cell carrier 16 is provided with an external thread 18.

Vertically below the load cell carrier 16 an adjusting foot 20 is located which is likewise essentially cup-shaped and which comprises a central, cylindrical recess 22. The inner wall of the cylindrical recess 22 is provided with an internal thread 24 which fits to the external thread 18 of the load cell carrier 16. The load cell carrier 16 is, with its external thread 18, screwed into the internal thread 24 of the adjusting foot 20. By turning the adjusting foot 20 relative to the load cell carrier 16 it can adjusted how deep the load cell carrier 16 is screwed into the cylindrical recess 22 of the adjusting foot 20, or to which level it is raised by turning it in an opposite sense of rotation, i.e. the vertical extension of the assembly of the adjusting foot 20 and the load cell carrier 16 is adjustable. In this manner the height level of each measuring foot 8 is individually adjustable.

In order to allow the adjustment of the height of the measuring foot 8 by turning the adjusting foot 20 relative to the load cell carrier 16, the load cell carrier 16 is mounted to be non-rotatable relative to the measuring platform 2, so that the load cell carrier 16 cannot turn together with the adjusting foot 20. This non-rotatable mounting can for example be realized in the following manner. The measuring platform 2 rests, with a damping support member 12 being interposed on each measuring foot 8, on the load cell 10. The damping support member 12 made of rubber has in the embodiment shown a frusto-conical shape, with the larger end face of the damping support member 12 being connected to the underside of the measuring platform, for example by an adhesive connection to the underside of the measuring platform 2. The frusto-conically shaped damping support member 12 is provided with a threaded pin 14 received therein, which threaded pin projects from the center of the smaller end face of the damping support member 14. The threaded pin 14 extends through a passage in the load cell 10 and projects on the underside of the load cell beyond the load cell 10. On the end of the threaded pin 14 projecting beyond the load cell 10 a nut is screwed and tightened firmly, to thereby create a frictional engagement of the load cell 10 with the damping support member 12 and thereby with the measuring platform 2. As indicated in FIG. 4, the load cell 10 is fixed by a pair of two screws and nuts to the load cell carrier 16 which is therefore non-rotatable with respect to the load cell 10 and therefore also with respect to the measuring platform 2.

The rotationally fixed mounting of the load cell carrier 16 with respect to the measuring platform 2 is further supported by the connection of each adjusting foot 16 by two frame members 6 extending therefrom (see FIGS. 1 and 4), wherein one end of the frame member 6 is resting on an edge of the load cell carrier 16 and is screwed on to fix it there. This is indicated in FIG. 4 in which above the end of the frame member 6 a screw is shown which, after lowering the end of the frame member 6 onto the edge of the load cell carrier 16, will be screwed into a thread provided for this purposes in the outer wall of the load cell carrier 16. Actually, for each frame member 6 two such screws are provided, which firmly connect the end of the frame member 6 to the edge of the load carrier 16.

Optionally, an adapter housing 30 is attached to the adjusting foot 20. The adapter housing 30 comprises an annular portion having a cylindrical passage 32 through which the adjusting foot 20 extends. The adapter housing 30 is not directly connected to the adjusting foot 20 so that the adjusting foot 20 can freely rotate with respect to the passage 32 of the adapter housing 30. In the portion of the adapter housing 30 being located radially outwards of the passage 32 of the adapter housing accessory parts which are not weighing relevant can be stored.

At the lower end of the measuring foot a foot plate 40 or base plate 40 is provided which has a planar central surface area which is firmly connected to the planar bottom on the underside of the adjusting foot 20. The foot plate 40 serves for introducing the weight force transmitted through the respective measuring foot 8 into the floor on which the weighing scale rests. By raising up the weighing scale, a user may individually adjust the height level of each measuring foot 8 by turning its foot plate 40. The rotation of the foot plate 40 is transmitted directly to the fixedly connected adjusting foot 20 which is thereby rotated relative to the load cell carrier 16 and thereby adjusts the vertical extension of the assembly of the adjust foot 20 and the load cell carrier 16. The load cell carrier 16 is, as described above, mounted to be rotationally fixed with respect to the measuring platform 2, and therefore cannot turn together with the adjusting foot 20 when it is turned for adjusting the height of the measuring foot 8.

The described configuration of the supporting feet of the weighing scale as measuring feed 8 makes it possible to realize a low vertical overall height of the weighing scale because the height-adjustable components of the foot (load cell carrier 16 and adjusting foot 20) are overlapping in vertical direction more or less depending to which extent the load cell carrier 16 is screwed into the adjusting foot 20 or is screwed out of it. In contrast, the prior art described above in the introduction had the load cell carrier with the load cell vertically located completely above the height-adjustable supporting foot so that their overall heights always were adding up to full extent which resulted in a large overall height of the prior art scale.

A further advantage of the described design of the measuring feet 8 is that the share of the gravitational weight force transmitted through each of the measuring feet 8 is transmitted purely vertically and centered through the measuring foot 8 into the floor. The transmission of the weight force from the measuring platform 2 progresses through the damping support member 12 centered on the load cell 10, and further vertically centered through the load cell carrier 16 which rests in a centered manner in the adjusting foot 20 such that the adjusting foot 20 eventually applies the weight force vertically via the foot plate 40 to the floor on which the weighing scale rests. In contrast, in the prior art between a point of application of force on the load cell and the point of the further transmission of the weight force to the floor a horizontal distance was present which could result in the generation of leverage and bending in the assembly whereas, for the measuring feet 8 the point of application of the weight force to the load cell and the point of the further transmission from the measuring foot into the floor are vertically aligned on top of each other and the transmission of the weight force through the measuring foot takes place exclusively in vertical direction. By the purely vertical transmission of the weight force of the measuring platform 2 acting on the measuring feet 8 to the floor permits an improved measuring accuracy of the weighing scale. For this reason it is possible also for large weighing scales with high load capacities to realize calibratable weighing scales with the design according to the present invention.

The invention claimed is:

1. A weighing scale comprising:
   a measuring platform;
   at least three supporting feet resting on a floor and supporting the measuring platform,
   each supporting foot being assigned a load cell that senses a share of the weight force originating from the measuring platform supported by the supporting foot,
   each supporting foot being designed as a vertically extending measuring foot and comprising—
   a load cell carrier on which the load cell rests and is attached, wherein the load cell carrier is provided with an external thread, and which is mounted to be non-rotatable with respect to the measuring platform, and
   an adjusting foot located below the load cell carrier, wherein the adjusting foot is provided with a circular-cylindrical recess for receiving at least a vertical section of the load cell carrier, wherein the circular-cylindrical recess being provided in its surrounding circumferential wall with an internal thread fitting to the external thread of the load cell carrier, wherein the load cell carrier is screwed with its external thread into the internal thread of the adjusting foot such that, by turning the adjusting foot relative to the load cell carrier, a vertical height of the measuring foot along a vertical screw axis is adjustable.

2. The weighing scale according to claim 1, wherein a damping support member is assigned to each measuring foot, the damping support member extending vertically between the measuring platform and the assigned measuring foot and is resting in a centered manner on the load cell at the top of the measuring foot, such that the force flow from the measuring platform is directed through the damping support member vertically into the vertically extending measuring foot.

3. The weighing scale according to claim 2, wherein the damping support members are made of rubber.

4. The weighing scale according to claim 2, wherein in each measuring foot the load cell is supported in a centered manner in the load cell carrier, and that the load cell carrier is screwed in a centered manner into the adjusting foot such that the force flow from the measuring platform is directed vertically through each measuring foot.

5. The weighing scale according to claim 4, wherein each damping support member has a frusto-conical shape, wherein a larger end face of the frusto-conical damping support member is abutting against an underside of the measuring platform and that the frusto-conical damping support member rests with its smaller end face on the load cell.

6. The weighing scale according to claim 5, wherein each measuring foot at its lower end is provided with a foot plate which is connected to the underside of the adjusting foot facing away from the measuring platform and which is configured to introduce the weight force transmitted through the measuring foot into the floor.

7. The weighing scale according to claim 6, wherein an adapter housing for accommodating not weighing relevant accessory parts comprises a vertical passage through which the adjusting foot extends, which adjusting foot is not connected to the adapter housing and is thus free to rotate relative to the passage, wherein the foot plate projects beyond the opening of the passage of the adapter housing to prevent the adapter housing from separating from the adjusting foot.

8. The weighing scale according to claim 2, wherein each damping support member has a frusto-conical shape, wherein a larger end face of the frusto-conical damping support member is abutting against an underside of the measuring platform and that the frusto-conical damping support member rests with its smaller end face on the load cell.

9. The weighing scale according to claim 8, wherein each measuring foot at its lower end is provided with a foot plate which is connected to the underside of the adjusting foot facing away from the measuring platform and which is configured to introduce the weight force transmitted through the measuring foot into the floor.

10. The weighing scale according to claim 9, wherein an adapter housing for accommodating not weighing relevant accessory parts comprises a vertical passage through which the adjusting foot extends, which adjusting foot is not connected to the adapter housing and is thus free to rotate relative to the passage, wherein the foot plate projects beyond the opening of the passage of the adapter housing to prevent the adapter housing from separating from the adjusting foot.

11. The weighing scale according to claim 2, wherein each measuring foot at its lower end is provided with a foot plate which is connected to the underside of the adjusting foot facing away from the measuring platform and which is configured to introduce the weight force transmitted through the measuring foot into the floor.

12. The weighing scale according to claim 11, wherein an adapter housing for accommodating not weighing relevant accessory parts comprises a vertical passage through which the adjusting foot extends, which adjusting foot is not connected to the adapter housing and is thus free to rotate relative to the passage, wherein the foot plate projects beyond the opening of the passage of the adapter housing to prevent the adapter housing from separating from the adjusting foot.

13. The weighing scale according to claim 1, wherein each measuring foot at its lower end is provided with a foot plate which is connected to the underside of the adjusting foot facing away from the measuring platform and which is configured to introduce the weight force transmitted through the measuring foot into the floor.

14. The weighing scale according to claim 13, wherein an adapter housing for accommodating not weighing relevant accessory parts comprises a vertical passage through which the adjusting foot extends, which adjusting foot is not connected to the adapter housing and is thus free to rotate relative to the passage, wherein the foot plate projects beyond the opening of the passage of the adapter housing to prevent the adapter housing from separating from the adjusting foot.

15. The weighing scale according to claim 1, wherein an adapter housing for accommodating not weighing relevant accessory parts comprises a vertical passage through which the adjusting foot extends, which adjusting foot is not connected to the adapter housing and is thus free to rotate relative to the passage, wherein the foot plate projects beyond the opening of the passage of the adapter housing to prevent the adapter housing from separating from the adjusting foot.

16. The weighing scale according to claim 1, wherein four measuring feet support the measuring platform.

17. The weighing scale according to claim 1, wherein the measuring feet form a connected measuring feet assembly in which each measuring foot is connected by two frame members to its two nearest neighboring measuring feet.

18. The weighing scale according to claim 17, wherein in or on the frame members electric conductors connected to the load cells are routed.

19. The weighing scale according to claim 17, wherein a plug socket is connected to at least one of the frame members and is connected to an electric conductor extending in the frame member.

20. The weighing scale according to claim 19, wherein the plug socket is a USB, a network or a power supply socket.

* * * * *